United States Patent Office 2,739,064
Patented Mar. 20, 1956

2,739,064
FEED

Carl Shelley Miner, Jr., Winnetka, and Bernard Wolnak, Chicago, Ill., assignors to Sewerage Commission of the City of Milwaukee, Milwaukee, Wis., a corporation of Wisconsin No Drawing. Application December 10, 1949, Serial No. 132,404

3 Claims. (Cl. 99—4)

This invention relates to feeds and has for an object the provision of a feed particularly useful for the feeding of poultry.

At the present time there is a large commercial market for prepared feeds for poultry. Such feeds as now commercially sold comprise essentially proteins and carbohydrates of vegetable origin, such as are contained in meals obtained from wheat, corn, rice, oats, barley, linseed, soybeans and cotton seed, etc. Usually a prepared feed contains a combination of meals of this character in varying proportions. In order to provide a satisfactory feed it has also been the practice to incorporate various vitamins and mineral constituents. Also it has long been believed that the vegetable proteins contained in meals of this type must be supplemented at least to some extent with animal proteins, such as fish meal or meat scraps, in order that the poultry fed may efficiently utilize all of the vegetable proteins contained within the feed. Generally speaking, such animal proteins have been incorporated into feeds of this character in various amounts between about 2 per cent and about 5 per cent in order that the desired response may be obtained in the poultry raised on the feed. However, fish meal, meat scraps and other animal proteins represent a substantial item of cost in the preparation of poultry feeds of this general character and are available only in limited amounts. Accordingly various attempts have been made in the past to cut down on the amount of and to find cheap substitutes for the animal proteins necessary to be added to poultry feeds without adversely affecting the desired response of the poultry fed.

Accordingly it is one object of this invention to provide a poultry feed containing a high proportion of vegetable proteins in which the amount of animal proteins, such as meat scraps or fish meal, can be reduced in amount or even eliminated without adversely affecting the response of the poultry fed on the feed.

A further object of this invention is the provision of a poultry feed which results in the optimum growth of chicks but into which it is necessary to incorporate little or no animal protein.

A still further object of this invention is the provision of a feed which will show improved growth response in the animal fed therewith.

Further and additional objects will appear from the following description and the appended claims.

In accordance with one embodiment of this invention it has been discovered that a poultry feed may be improved by adding thereto a relatively small amount of a sludge resulting from the microbiological treatment of sewage or an extract of a sludge of this type. In accordance with this invention, a poultry feed having a nutritive base which comprises principally proteins and carbohydrates of vegetable origin is greatly improved by the addition thereto of a small amount of a sludge resulting from the microbiological treatment of sewage or an extract thereof. By the addition of such a sludge or extract it has been found possible to cut down the proportion of, or even eliminate entirely, the animal proteins which have generally been considered as necessary to obtain the optimum growth response from feeds of this type.

In accordance with a preferred embodiment of this invention, the sludge employed is of the type known as activated sludge. Dried activated sludge is now available commercially and sold under the trade name "Milorganite." It is the product obtained from that type of sewage treatment and purification known in the art as the "activated sludge process." The commercial procedure for obtaining a dried form of activated sludge is somewhat as follows: Raw sewage, sanitary and industrial, is brought to a sewage-treating plant by an extensive system of sewers. The incoming raw sewage is passed through partial sedimentation tanks and screens to remove large particles of suspended mineral and organic matter. The screened sewage is then mixed with, for example, about 25 per cent by volume of undried, freshly produced activated sludge which latter serves as an inoculant. The resulting mixture, termed "mixed liquor," is then passed through large aeration tanks where it is agitated and aerated for four to six hours by a continuous stream of tiny air bubbles. The air bubbles are formed in the mixed liquor by passing washed and compressed air through porous plates in the bottom of the aeration tanks. During aeration the finely divided organic matter in the mixed liquor coagulates into large flocs which comprise essentially the bodies of bacteria, molds, yeasts and protozoa. The aerated mixed liquor is then passed into large settling tanks where the flocculated matter settles to the bottom as activated sludge. The supernatant liquid comprising water and harmless soluble substances, such as nitrates and sulfates, is discharged from the treating plant. A portion of this settled activated sludge (containing about 2% by weight of solids) is used to inoculate fresh incoming screened sewage as above described and the remaining sludge is treated with ferric chloride and filtered. The ferric chloride serves to speed the filtering operation. The filter cake containing from about 80% to about 85% moisture is dried to about 5% moisture with artificial heat in large revolving driers. The resulting granular substance is screened to uniform particle size, bagged and sold under the trade name "Milorganite." To date the chief use of this product has been as a fertilizer.

While in the foregoing a more or less specific method has been indicated for the preparation of activated sludge, it will, of course, be apparent that the process may be deviated from whereby to produce a sludge suitable for incorporation into an animal feed as contemplated by this present invention. For example, reagents other than ferric chloride, such as sulfuric acid, aluminum sulfate, aluminum chloride, and the like, may be used as coagulants to speed the final filtering operation. If desired, such coagulants may be omitted entirely. By the term "activated sludge" as used in this specification and in the appended claims is meant any substance which comprises essentially a mass of microorganisms that is formed by the aeration of inoculated sewage under conditions favoring microbial growth.

In accordance with this invention, the dried activated sludge may be added directly to a base ration in amounts up to about 5 per cent by weight on a dry basis in order to achieve a feed imparting the desired growth response in poultry fed therewith. The specific factor present in activated sludge that improves feeds in accordance with this invention appears to be soluble in water. Therefore, under certain conditions it may be desirable to employ as the additive a water or other solvent extract of activated sludge. A suitable water extract may be prepared in any desired manner, such as by dispersing dried activated sludge in water, adjusting the hydrogen ion concentration towards neutrality with ammonia or other suitable alkali, and thereafter separating the undissolved solids from the water extract. The water extract may then be evaporated to effect a concentration of the water soluble constituents.

As previously indicated, the sludge or sludge extract can in accordance with this invention be incorporated into any type of poultry feed which contains substantial amounts of vegetable proteins and carbohydrates in order to replace in whole or in part the animal proteins that have heretofore been considered necessary. For example, such feeds may include singly or in various combinations soybean meal, alfalfa leaf meal, linseed meal, cottonseed meal and various grain meals, such as those derived from wheat, corn, rice, oats, buckwheat, barley, etc. Preferably the vegetable base of the feed is fortified with appropriate minerals and vitamins as is well known in the art. In accordance with this invention, dried sludge or dried sludge extract may be added to feeds of this type in effective amounts up to about 5% by weight in order to improve the feed and to permit the animal efficiently to utilize the vegetable proteins present therein. However, as the following description will show, good growth response is obtained wherein the concentration of dried sludge is between 0.1 and 1.0 per cent by weight.

For a more complete understanding of this invention, reference is now made to a specific example. It will be understood, of course, that this invention is not to be limited to the example given since the specific formulation of the various components of the feed is not original with us and is here given only as an illustrative example of a feed into which sludge or sludge extract may be incorporated in accordance with this invention.

EXAMPLE

In order to illustrate this invention, a poultry feed having the following ingredients as a nutritive base ration is employed:

| | | |
|---|---|---|
| Ground yellow corn | lbs | 1200 |
| Soybean oil meal | lbs | 700 |
| Bone meal | lbs | 40 |
| Ground oyster shells or limestone | lbs | 30 |
| Ioodized salt | lbs | 20 |
| Vitamin A and D feeding oil | lbs | 4 |
| Manganese sulfate | lbs | 0.6 |
| Riboflavin | grams | 3 |

The above listed ingredients are thoroughly mixed in the usual manner and about 0.33 per cent by weight of dry finely ground Milorganite is thoroughly incorporated with the resulting base ration. The resulting feed produces good growth response in chicks, the presence of the Milorganite serving to obtain optimum growth. Thus the Milorganite serves to replace the meat scraps or fish meal previously thought necessary in poultry feeds comprising essentially carbohydrates and proteins from vegetable sources.

The percentage of dried sludge, such as Milorganite, to be employed in the feed in accordance with this invention will depend upon whether optimum results are desired and whether the feed contains, in addition, animal proteins, such as those contained in meat scraps or fish meal. When such animal proteins are absent, the amount of Milorganite necessary to be added to obtain the desired result is less than about 5 per cent by weight, the preferred range being between about 0.1 per cent and about 1.0 per cent by weight. Excellent growth response has been achieved wherein the amount of Milorganite is of the order of 0.33 per cent as suggested in the foregoing example. Of course, if small amounts of animal protein are present in the feed, the amount of Milorganite necessary to obtain the desired growth response will be less.

As previously indicated, a solvent or water extract of activated sludge may be used in place of the activated sludge itself for improving a poultry feed in accordance with this invention. This water extract may be prepared by any one of a number of different methods that are commonly used for extracting substances that are themselves largely insoluble in the solvent employed. In accordance with one embodiment of this invention, 3600 grams of Milorganite were added to 12 liters of tap water heated to 70° C. The mixture was stirred and the temperature raised to about 80° C., the hydrogen ion concentration being adjusted from a normally acid condition to a value corresponding to pH 7.0±0.5 by the occasional addition of 1 to 1 aqueous ammonia. After cooling overnight, the mixture was reheated for five hours, filtered with suction and the filtrate evaporated on a steam bath to a heavy syrup. The syrup was then evaporated to dryness in an oven at 70° C. resulting in a brown solid which was easily ground down to a brown powder. This concentrate is useful for the formulation of the feed described in the foregoing specific example. It will, of course, be recognized that the extraction process may be varied within wide limits. For example, short time extractions at low temperatures, as well as longer time extractions at higher temperatures, are possible, depending on the degree of extraction desired, the physical nature of the sludge being extracted, hydrogen ion concentrations, etc. The process of extracting sludge as outlined above is disclosed and claimed in our copending application Ser. No. 213,794, filed March 3, 1951.

In order positively to demonstrate the effectiveness of the activated sludge and a dry concentrate of a water extract of activated sludge when added to a poultry feed in accordance with this invention, certain standard assays were carried out in accordance with the procedure used by Roblee et al. described in the "Journal of Biological Chemistry," vol. 173, at page 117 (1948). These assays involved the feeding of chicks under closely controlled conditions in which groups of chicks were grown on a basic all vegetable protein feed to which various supplements were added. In this assay the weight gained by a group of twenty chicks fed on the basic feed for a period of four weeks was taken as the negative control value. In order to provide another standard of comparison, another group of twenty chicks was grown on the same basic feed to which there had been added an amount of animal protein sufficient to insure good growth (weight gain). Three per cent of condensed fish solubles was used to provide this standard and the resulting weight gain of these chicks was taken as the positive control value. The sludge material or concentrate being assayed was then added in varying amounts to the basic feed and each feed thus prepared was fed to similar groups of twenty chicks each. From the weight gain of the chicks in each of the last-mentioned groups a comparative figure between the sludge or sludge concentrate and the animal protein (condensed fish solubles) can be ascertained. It is this method that has been successfully employed for biologically assaying materials for the animal protein factor (APF).

In the chick assays about to be described the base ration included the following ingredients in parts by weight:

| | |
|---|---|
| Wheat bran | 5 |
| Wheat middlings | 5 |
| Dehydrated alfalfa leaf meal | 5 |
| Soybean oil meal | 50 |
| Corn gluten meal | 10 |
| Steamed bone meal | 2 |
| Ground yellow corn | 18 |
| Granite grits | 2 |
| Limestone grits | 2 |
| Iodized salt | 0.5 |
| Fish oil | 0.2 |
| Manganese sulfate | 0.025 |
| Iodinated casein (Protamone) | 0.05 | to each 100 grams of which the following were added in the following amounts expressed in milligrams:

| | |
|---|---|
| Thiamine | 0.3 |
| Riboflavin | 0.6 |
| Niacin | 5.0 |
| Calcium pantothenate | 2.0 |
| Pyridoxine | 0.4 |
| Inositol | 100.0 |
| Choline | 150.0 |
| Para amino benzoic acid | 10.0 |
| Biotin | 0.02 |
| Folic acid | 0.05 |
| Menadione | 0.05 |
| Alpha tocopherol | 0.3 |

The first assays herein reported were run on 15 groups of chicks with 20 chicks per group and are reported in Table I. Group 1 represents the negative control in which the chicks were fed the base ration indicated above. Groups 2, 3, 4 and 5 are positive controls in which the chicks were fed the base ration to which the respectively indicated weight percentages of condensed fish solubles were added. Group 4, comprising those chicks fed with the base ration containing 3 per cent fish solubles, is the primary control group upon which the percentage response for the other groups is calculated. Group 6 may be considered as another control in which 0.4 per cent liver powder was added to the base ration.

Groups 7, 8 and 9 represent those chicks fed with the base ration to which the respectively indicated amounts of sample No. M101–219 were added. The No. M101–219 sample was dried activated sludge which was prepared by withdrawing settled activated sludge from a settling tank in a commercial activated sludge process as previously described and by filtering it directly without treatment with a flocculating agent such as ferric chloride. The filtered and untreated cake was dried at 165° F. and the dried cake was ground in a ball mill and screened. The particles passing a 150 mesh screen comprised the M101–219 sample.

Groups 10, 11 and 12 represent those chicks fed with the base ration containing the respectively indicated percentages of sample No. M101–220. This sample is similar to the above indicated sample No. M101–219 except that the activated sludge removed from the process settling tank was acidified with sulfuric acid to lower the hydrogen ion concentration of the sludge to a value corresponding to pH 3.3. The acidified and thus coagulated sludge was then filtered, dried, ground and sieved as in the case of sample No. M101–219.

Groups 13, 14 and 15 represent those chicks fed with the base ration containing the respectively indicated percentages of sample No. M101–221. This was a sample of regular Milorganite produced by coagulation with ferric chloride in the usual manner in the activated sludge process. The Milorganite of this sample was ground and the particles employed in the base ration all passed through a 150 mesh screen.

Table I

| Group | Supplement | Av. Wt. at 4 Weeks (grams) | Wt. Gain (grams) | Percent Response |
|---|---|---|---|---|
| 1 | Negative control | 241 | 0 | 0 |
| 2 | 1% fish solubles | 270 | 29 | 57.0 |
| 3 | 2% fish solubles | 277 | 36 | 70.5 |
| 4 | 3% fish solubles | 292 | 51 | 100.0 |
| 5 | 4% fish solubles | 296 | 55 | 108.0 |
| 6 | 0.4% 1-20 liver powder | 286 | 45 | 88.3 |
| 7 | M101-219, 1% | 282 | 41 | 80.5 |
| 8 | M101-219, 0.33% | 284 | 43 | 84.3 |
| 9 | M101-219, 0.10% | 272 | 31 | 60.7 |
| 10 | M101-220, 1% | 299 | 58 | 113.8 |
| 11 | M101-220, 0.33% | 302 | 61 | 119.5 |
| 12 | M101-220, 0.10% | 276 | 35 | 68.7 |
| 13 | M101-221, 1% | 285 | 44 | 86.3 |
| 14 | M101-221, 0.33% | 289 | 48 | 94.2 |
| 15 | M101-221, 0.10% | 274 | 33 | 64.7 |

In Table I the first and second columns indicate the several groups of chicks and the supplement which was added to the base ration used for feeding each group. The third column indicates the average weight of the chicks in each group after four weeks of being fed with the indicated ration. The fourth column indicates the weight gain in grams of the chicks of each group over the negative control (Group 1). The fifth column indicates the per cent growth response exhibited by the several supplemental ingredients basing the growth exhibited by the feed containing 3 per cent fish solubles (Group 4) over the negative control (Group 1) as 100%.

It will be noted that the various samples tested, that is, Nos. M101-219, -220 and -221 all produced a substantial growth response in the chicks when compared with the negative control. It is to be noted that these tests also show that the several samples of activated sludge when present in the feed in amounts of only 0.1 per cent are comparable to the results shown by the positive control containing 1.0 per cent fish solubles (Group 2). Table I also shows that, of the three percentages tested for each of the three samples, the feeds containing 0.33 per cent of the supplements (Groups 8, 11 and 14) are comparable in results to Group 4 which contained about nine times as much condensed fish solubles.

It is thus clear that dried activated sludge when added to a nutritive base ration may at least partially take the place of fish solubles or other animal proteins which have heretofore been considered necessary for poultry feeds. It is also clear that the growth response cannot be attributed to the iron salts in the Milorganite introduced in the usual processing step.

In order to demonstate the effect of a concentrated water extract of Milorganite, a dry concentrate prepared in the manner previously disclosed (sample M178) was assayed in the manner indicated above at a 1 per cent level with the results appearing in Table II.

Table II

| Group | Supplement | Av. Wt. at 4 Weeks (grams) | Wt. Gain (grams) | Percent Response |
|---|---|---|---|---|
| 1 | Negative control | 232 | | |
| 2 | 3% Fish solubles | 293 | 61 | 100 |
| 3 | 1% M178 | 294 | 62 | 102 |

These results indicate that 1 per cent of the dried water extract in the feed was as effective as 3 per cent fish solubles.

In view of the foregoing considerations, it has been demonstrated that the animal protein material heretofore considered necessary in a base ration for poultry may be replaced wholly or partially by activated sludge or a water extract of activated sludge.

As indicated above, activated sludge or an extract thereof is the preferred additive to poultry feeds in accordance with this invention. However, in its broader aspects, this invention contemplates the use of other types of sludges resulting from the microbiological treatment of sewage. For example, digested activated sludge or sedimented digested sludge may be employed. Digested activated sludge is the product formed by aerobically treating screened raw sewage, passing the thus treated material to a settling tank, allowing the solids to settle, drawing off the supernatant liquid, passing the settled solids to a closed vessel, and digesting the solids under anaerobic conditions. The solid material which remains after the anaerobic digestion is separated and may be dried. Sedimented digested sewage sludge is prepared by passing screened raw sewage to settling tanks and withdrawing the settled solid material to closed tanks wherein it is allowed to undergo an anaerobic digestion. The solid material remaining after the anaerobic digestion is separated and dried. Suitable concentrates may also be prepared from these sludges by water extraction.

Water extraction has been specifically disclosed in the foregoing for the preparation of the concentrates, but it is clear that other solvents capable of leaching the chick growth factor from the sludge, such as isopropyl, ethyl or methyl alcohol, etc., may be employed.

It will be apparent from the foregoing description that a feed has been provided which is particularly adapted for providing optimum growth response in poultry, such as chickens, ducks, geese, turkeys and the like. This invention also finds application in the preparation of feeds for other nonruminant animals such as hogs.

While particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A poultry feed deficient in animal protein comprising essentially vitamin- and mineral-fortified vegetable proteins and carbohydrates and containing about 0.33 per cent by weight (dry basis) of dried activated municipal sewage sludge.

2. An animal feed comprising essentially vegetable proteins and carbohydrates and containing up to about one per cent by weight (dry basis) of a water-soluble extract of municipal sewage sludge.

3. A poultry feed deficient in animal protein comprising essentially vegetable proteins and carbohydrates and containing up to about one per cent by weight (dry basis) of a water extract of dried activated municipal sewage sludge.

References Cited in the file of this patent

UNITED STATES PATENTS

| | | |
|---|---|---|
| 1,524,233 | Berrigan | Jan. 27, 1925 |
| 1,543,154 | Fox | June 23, 1925 |
| 2,328,361 | Sanders | Aug. 31, 1943 |

OTHER REFERENCES

Bulletin 466, Annual Report of Director of the Agr. Exp. Sta. U. of M. (May 1, 1945), What's New in Science, pp. 52 and 53.

Bulletin 469, same title (May 1946), p. 61.